F. HALENAR.
INSECT TRAP.
APPLICATION FILED DEC. 4, 1917.

1,285,686.

Patented Nov. 26, 1918.

Inventor
FRANK HALENAR
By his Attorney

UNITED STATES PATENT OFFICE.

FRANK HALENAR, OF CLAYVILLE, NEW YORK.

INSECT-TRAP.

1,285,686.  Specification of Letters Patent.  Patented Nov. 26, 1918.

Application filed December 4, 1917. Serial No. 205,314.

*To all whom it may concern:*

Be it known that I, FRANK HALENAR, a subject of the King of Hungary, resident of Clayville, county of Oneida, and State of New York, have invented certain new and useful Improvements in Insect-Traps, of which the following is a specification.

This invention relates to improvements in devices for catching insects, particularly those having wings and has as its principal object the provision of means whereby such insects as flies, may be enticed and confined within a container of ornamental form which may be placed in any desired location.

A further object is to provide means whereby the insect inlet may be opened or closed from the exterior and held when in an open position for operation.

These and other like objects are attained by the novel construction and combination of parts hereinafter described and shown in the accompanying drawing, forming a material part of this disclosure, and in which—

Figure 1:
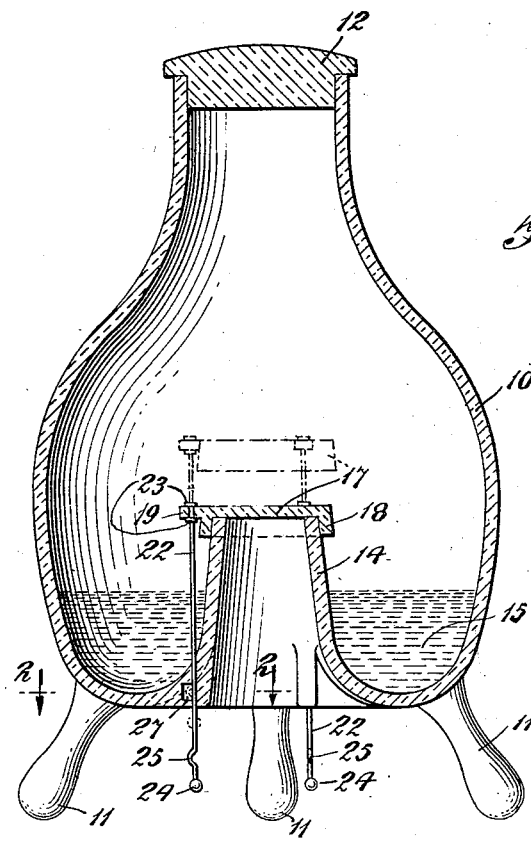
Figure 1 is a vertical sectional view taken through the center of a fly trap made in accordance with the invention.
Figure 2:
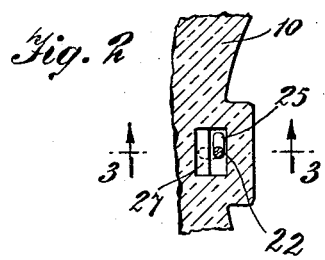
Fig. 2 is an enlarged fragmental view taken substantially on line 2—2 of Fig. 1.
Figure 4:
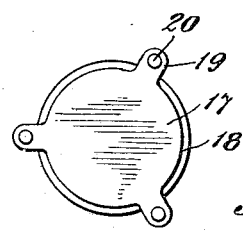
Fig. 4 is a top plan view of the interior cover in detail.
Figure 3:
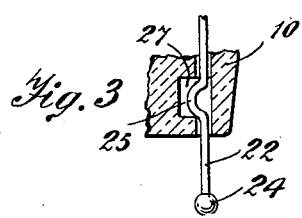
Fig. 3 is a similar sectional view taken on line 3—3 of Fig. 2.

In carrying out the invention, use is made of a container 10, preferably made with transparent walls and shaped to resemble a water bottle or carafe, but provided with depending feet 11, which raise the container from the surface so as to admit flies or other insects therebelow.

A stopper 12 is suited to cover the top opening in the container, while directly below, rising from the bottom, at the center of the container, is a raised conical tube 14, surrounded by an annular depression 15, adapted to contain liquid in which the insects may be destroyed. A cover 17, is formed with an annular flange 18, suited to be received upon the tube 14, and extending laterally outward from the cover are three lugs 19, through which are formed openings 20, receptive of the upper ends of rods 22, secured to the cover by means of fixed collars 23, the lower ends of the rods 22 extending downward through the bottom of the container and having at their extreme ends, knobs 24 by which they may be raised or lowered. It will be understood, of course that suitable stuffing boxes will be secured upon the bottom of the container 10 in line with the openings 20 and containing suitable packing, so that the rods 22 may freely slide through said packing in the stuffing boxes and so that a fluid-tight connection may thus be had to prevent leakage of the fluid through said openings. As these expedients are within range of any skilled mechanic they are not illustrated in the present application.

Adjacent to the knobs 24, are short bends 25, the same being adapted to engage in recesses 27 formed in the lower walls of the container, when the rods are in a raised position, acting in the manner of catches so as to hold the cover 17 raised, the bends 25 being caused to engage in the recesses 27, by rotating the knobs 24, the rods freely turning in the cover.

From the foregoing it will be seen that should it be desired to close the insect openings it can be readily accomplished by properly manipulating the rods 22, while conversely, partially rotating, and raising the rods raises the cover, so that it will be held in operative position.

Having thus described my invention what I claim as new and desire to secure by Letters Patent, is—

1. In combination a container having depending supporting feet, an integral raised conical tube formed centrally upon the bottom of said container, a cover having an annular flange seating upon the tube to close the same, a series of actuating rods passing upwardly into the bottom of the container and secured to said cover, the lower ends of said rods projecting below the container, and means whereby the rod in vertical movement to open position may be automatically locked.

2. In combination a container, means for supporting said container, said container being formed with a central upwardly-extending tube, a cover adapted to seat upon the tube and close the same, the line of juncture of said tube and container being thickened, a series of rods passing upwardly into the thickened portion of said container slidably and having its upper end secured to said cover, each of said rods having a lateral bend formed thereupon, the thickened portion of said tube being formed with a recess to accommodate said bend in its vertical movement, said recess being wide enough to receive said bend snugly so as to cause the latter to rest upon the bottom of said recess and thus hold the cover unseated.

In testimony whereof I have affixed my signature.

FRANK HALENAR.

Copies of this patent may be obtained for five cents each, by addressing the "Commissioner of Patents, Washington, D. C."